United States Patent
Aoshima

(10) Patent No.: US 6,192,007 B1
(45) Date of Patent: Feb. 20, 2001

(54) PAGER AND TIME DISPLAY METHOD FOR PAGER WHICH CAN DISPLAY BOTH LOCAL TIME AND BASE TIME

(75) Inventor: Takashi Aoshima, Shizuoka (JP)

(73) Assignee: NEC Corporation, Tokyo (JP)

(*) Notice: Under 35 U.S.C. 154(b), the term of this patent shall be extended for 0 days.

(21) Appl. No.: 09/291,308

(22) Filed: Apr. 15, 1999

(30) Foreign Application Priority Data

Apr. 24, 1998 (JP) .................................................. 10-115193

(51) Int. Cl.⁷ ............................. G04B 47/00; H04Q 7/00; G08B 5/22; G04C 11/00
(52) U.S. Cl. ................................ 368/10; 368/21; 368/47; 340/825.44; 340/825.49
(58) Field of Search .................................. 368/10, 21, 22, 368/47; 340/825.26, 825.44, 825.47, 825.48, 825.49, 825.04; 455/181

(56) References Cited

U.S. PATENT DOCUMENTS

| 5,089,814 | * | 2/1992 | DeLuca et al. | 340/825.49 |
| 5,375,104 | * | 12/1994 | Ishii et al. | 368/22 |
| 6,101,370 | * | 8/2000 | Eaton et al. | 455/38.1 |

FOREIGN PATENT DOCUMENTS

| 4-119020 | 4/1992 | (JP) . |
| 4-504941 | 8/1992 | (JP) . |
| 5-48696 | 2/1993 | (JP) . |
| 6-13977 | 1/1994 | (JP) . |
| 6-188814 | 7/1994 | (JP) . |
| 6-232800 | 8/1994 | (JP) . |
| 7-79194 | 3/1995 | (JP) . |

OTHER PUBLICATIONS

English translation of Japanese Office Action dated Mar. 23, 1999 (Hei 11).

* cited by examiner

Primary Examiner—Vit Miska
(74) Attorney, Agent, or Firm—McGuireWoods LLP

(57) ABSTRACT

A pager which can display base time in the base area of the pager along with displaying corrected local time in an area in which the pager is located is presented. The pager receives a country code and an area code transmitted by a paging system. A system information detection section judges whether or not the received country code and area code are the same as a country code and an area code corresponding to the base area of the pager. If the received country code and area code did not match, the CPU of the pager searches a time difference table for a piece of time difference information, based on the received country code and area code. The CPU judges whether or not the time difference information acquired by the search is the same as time difference information which has been stored in a time difference information memory section. If the time difference information acquired by the search is not the same, the local time which is clocked by a local clock section is corrected based on the acquired time difference information and the base time which is clocked by a base clock section. The CPU displays the local time clocked by the local clock section and the base time clocked by the base clock section on an LCD.

18 Claims, 4 Drawing Sheets

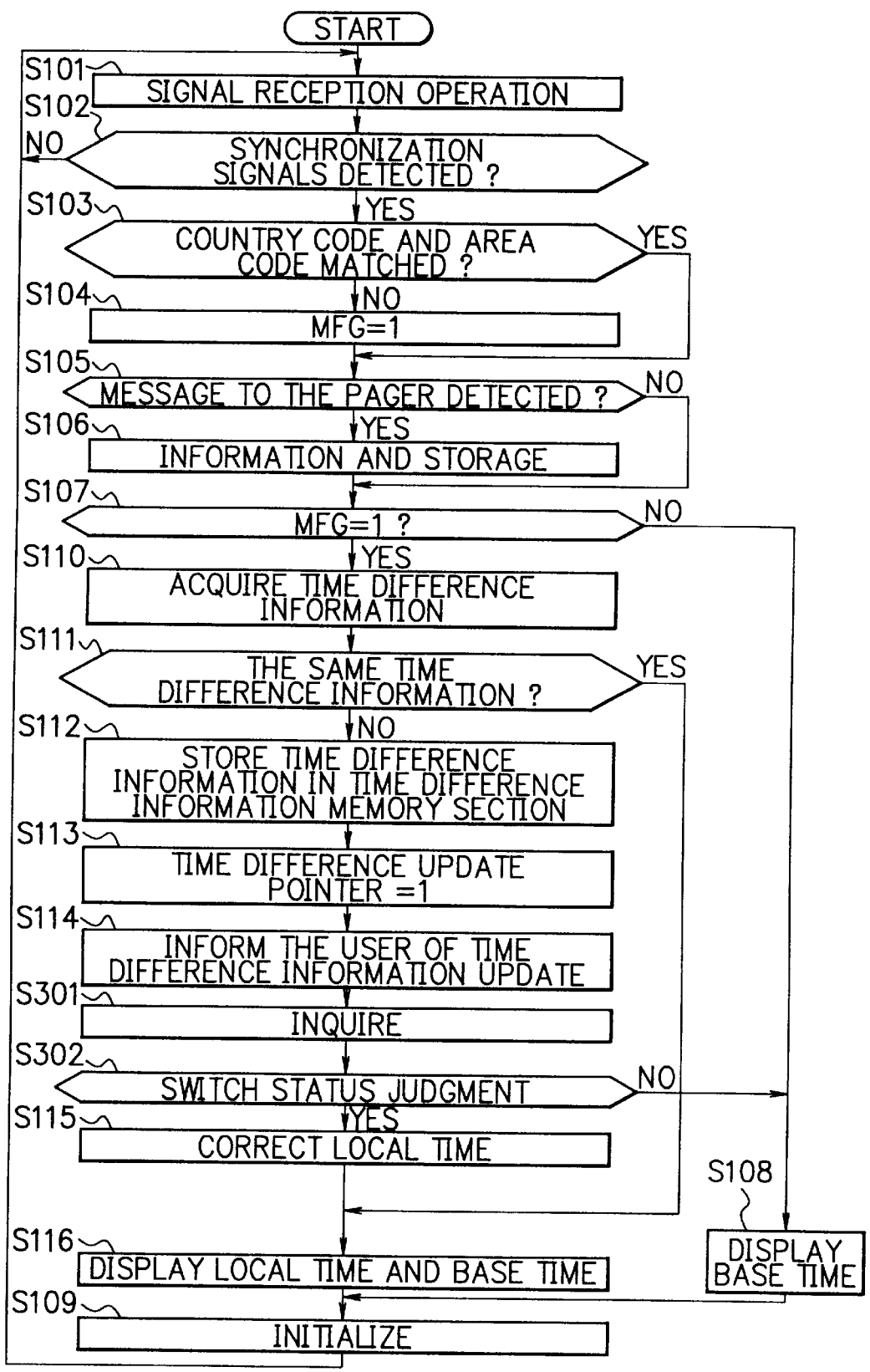

PAGER AND TIME DISPLAY METHOD FOR PAGER WHICH CAN DISPLAY BOTH LOCAL TIME AND BASE TIME

BACKGROUND OF THE INVENTION

The present invention relates to a pager which is supposed to be used in a wide area, and in particular, to a pager which is provided with functions for automatically correcting the time of day which is clocked by a clock section of the pager.

DESCRIPTION OF THE PRIOR ART

In these days, pagers for receiving radio selective calling from a paging system are widely used around the world. The pager is generally provided with a clock section for clocking the time of day in an area in which the pager is located. However, in the case of paging systems in Europe, in the United States, etc., there exist time differences between countries or areas (states etc.), and thus the user of the pager has to frequently correct the time which is clocked by the clock section if the user carries the pager across areas having time differences.

To resolve the problem, pagers which automatically correct the time clocked by the clock section have been proposed, as disclosed in Japanese Patent Application Laid-Open No.HEI6-188814 etc. The pager disclosed in the document receives an area code (indicating an area in which the pager is located) which is periodically transmitted by the paging system, and automatically corrects the time clocked by the clock section based on time difference information which is obtained by searching a time difference table using the received area code.

However, such a conventional pager is generally provided with only one clock section. Therefore, when the pager received an area code that is different from an area code which has been stored in the pager, the area code stored in the pager is updated to the newly received area code and the time clocked by the only one clock section is corrected (updated) to the time of day in the area corresponding to the received area code, and the updated local time is displayed by a display section such as an LCD (liquid crystal display) to the user. Therefore, when such a pager received a different area code, only the local time (i.e. the time of day in an area corresponding the received area code) is displayed to the user, and the user can not see the base time or the original time, that is, the time of day in the base area of the pager (i.e. the time of day in the area in which the pager has been distributed to the user).

SUMMARY OF THE INVENTION

It is therefore the primary object of the present invention to provide a pager which can automatically correct the time of day clocked by the clock section to the local time in the area in which the pager is located immediately and correctly and display the corrected local time, and which can also display the base time in the base area of the pager to the user.

Another object of the present invention is to provide a time display method for a pager, by which the time of day clocked by the clock section of the pager can automatically be corrected to the local time in the area in which the pager is located immediately and correctly and the corrected local time can be displayed, and by which the base time in the base area of the pager can also displayed to the user.

In accordance with a first aspect of the present invention, there is provided a pager for receiving radio selective calling from a paging system, comprising a base area code memory means, a time difference table storage means, a base clock means, a local clock means, a code reception means, a code matching judgment means, a time difference information searching means, a time difference information matching judgment means, a time difference information memory means, a local time correction means, and a time display means. The base area code memory means prestores a country code and an area code which indicate the base area of the pager. The time difference table storage means prestores a table including country codes and area codes of a plurality of countries and areas and time difference information of each country/area in comparison with a reference time such as the GMT (Greenwich Mean Time). The base clock means clocks base time, which is the time in the base area of the pager. The local clock means clocks local time, which is the time in an area in which the pager is located. The code reception means receives a country code and an area code which are transmitted by a base station of the paging system. The code matching judgment means judges whether or not the country code and the area code received by the code reception means are the same as the country code and the area code stored in the base area code memory means. The time difference information searching means searches the time difference table storage means for a piece of time difference information based on the country code and the area code received by the code reception means, if the code matching judgment means judged that the country code and the area code received by the code reception means are not the same as the country code and the area code stored in the base area code memory means. The time difference information matching judgment means judges whether or not the time difference information acquired by the time difference information searching means is the same as time difference information which has been stored in the time difference information memory means. Time difference information stored in the time difference information memory means is updated to the time difference information acquired by the time difference information searching means by the search, if the time difference information matching judgment means judged that the time difference information acquired by the time difference information searching means is not the same as the time difference information which has been stored in the time difference information memory means. The local time correction means executes correction of the local time clocked by the local clock means based on the time difference information acquired by the time difference information searching means and the base time clocked by the base clock means, if the time difference information matching judgment means judged that the time difference information acquired by the time difference information searching means is not the same as the time difference information which has been stored in the time difference information memory means. And the time display means displays the base time clocked by the base clock means and the local time clocked by the local clock means.

In accordance with a second aspect of the present invention, in the first aspect, the pager further comprises an informing means. The informing means informs the user about the correction of the local time and/or the corrected local time when the local time correction means executed the correction of the local time clocked by the local clock means.

In accordance with a third aspect of the present invention, in the first aspect, the pager further comprises an area name display means. The area name display means displays the names of a country and an area corresponding to the country code and the area code received by the code reception means, in the case where the code matching judgment means judged that the country code and the area code received by the code reception means are not the same as the country code and the area code stored in the base area code memory means.

In accordance with a fourth aspect of the present invention, there is provided a pager for receiving radio selective calling from a paging system, comprising a base area code memory means, a time difference table storage means, a base clock means, a local clock means, a code reception means, a code matching judgment means, a time difference information searching means, a time difference information matching judgment means, a time difference information memory means, a local time correction inquiry means, a local time correction means, and a time display means. The components of the pager other than the local time correction inquiry means and the local time correction means operate basically in the same way as those of the pager according to the first aspect of the present invention. The local time correction inquiry means inquires of the user about whether or not the user intends to let the pager correct the local time clocked by the local clock means, if the time difference information matching judgment means judged that the time difference information acquired by the time difference information searching means is not the same as the time difference information which has been stored in the time difference information memory means. The local time correction means executes correction of the local time clocked by the local clock means based on the time difference information acquired by the time difference information searching means and the base time clocked by the base clock means, if the user answered to the local time correction inquiry means that the user intends to let the pager correct the local time clocked by the local clock means. And the time display means displays the base time clocked by the base clock means and the local time clocked by the local clock means.

In accordance with a fifth aspect of the present invention, in the fourth aspect, the pager further comprises an informing means. The informing means informs the user about the correction of the local time and/or the corrected local time when the local time correction means executed the correction of the local time clocked by the local clock means.

In accordance with a sixth aspect of the present invention, in the fourth aspect, the pager further comprises an area name display means. The area name display means displays the names of a country and an area corresponding to the country code and the area code received by the code reception means, in the case where the code matching judgment means judged that the country code and the area code received by the code reception means are not the same as the country code and the area code stored in the base area code memory means.

In accordance with a seventh aspect of the present invention, there is provided a pager for receiving radio selective calling from a paging system, comprising a base area code memory means, a time difference table storage means, a base clock means, a local clock means, a code reception means, a local time information reception means, a code matching judgment means, a time difference information searching means, a time difference information matching judgment means, a time difference information memory means, a first local time correction means, a base time correction means, a second local time correction means, and a time display means. The components of the pager other than the local time information reception means, the first local time correction means, the base time correction means and the second local time correction means operate basically in the same way as those of the pager according to the first aspect of the present invention. The local time information reception means executes reception of local time information which is transmitted by the base station of the paging system. The first local time correction means executes correction of the local time clocked by the local clock means based on the time difference information acquired by the time difference information searching means and the base time clocked by the base clock means, if the time difference information matching judgment means judged that the time difference information acquired by the time difference information searching means is not the same as the time difference information which has been stored in the time difference information memory means. The base time correction means executes correction of the base time clocked by the base clock means based on the local time information, if the code matching judgment means judged that the country code and the area code received by the code reception means are the same as the country code and the area code stored in the base area code memory means and if the local time information reception means received the local time information transmitted by the base station of the paging system. The second local time correction means executes correction of the local time clocked by the local clock means based on the local time information, if the time difference information matching judgment means judged that the time difference information acquired by the time difference information searching means is not the same as the time difference information which has been stored in the time difference information memory means and if the local time information reception means received the local time information transmitted by the base station of the paging system. And the time display means displays the base time clocked by the base clock means and the local time clocked by the local clock means.

In accordance with an eighth aspect of the present invention, in the seventh aspect, the pager further comprises an informing means. The informing means informs the user about the correction of the local time and/or the corrected local time when the first local time correction means executed the correction of the local time clocked by the local clock means.

In accordance with a ninth aspect of the present invention, in the seventh aspect, the pager further comprises an area name display means. The area name display means displays the names of a country and an area corresponding to the country code and the area code received by the code reception means, in the case where the code matching judgment means judged that the country code and the area code received by the code reception means are not the same as the country code and the area code stored in the base area code memory means.

In accordance with a tenth aspect of the present invention, there is provided a time display method for a pager for receiving radio selective calling from a paging system. The time display method comprises a base area code memory step, a time difference table storage step, a base time clocking step, a local time clocking step, a code reception step, a code matching judgment step, a time difference information searching step, a time difference information matching judgment step, a time difference information update step, a local time correction step, and a time display step. In the base area code memory step, a country code and an area code which indicate the base area of the pager are prestored in a base area code memory means of the pager. In the time difference table storage step, a table including country codes and area codes of a plurality of countries and areas and time difference information of each country/area in comparison with a reference time such as the GMT (Greenwich Mean Time) is prestored in a time difference table storage means of the pager. In the base time clocking step, a base clock means of the pager clocks base time, which is the time in the base area of the pager. In the local time clocking step, a local clock means of the pager clocks local time, which is the time in an area in which the pager is located. In the code reception step, a code reception means of the pager receives a country code and an area code which are transmitted by a base station of the paging system. In the code matching judgment step, a code matching judgment means of the pager judges whether or not the country code and the area code received in the code reception step are the same as the country code and the area code stored in the base area code memory means. In the time difference information searching step, a time difference information searching means of the pager searches the time difference table storage means for a piece of time difference information based on the country code and the area code received in the code reception step, if the code matching judgment means judged in the code matching judgment step that the country code and the area code received in the code reception step are not the same as the country code and the area code stored in the base area code memory means. In the time difference information matching judgment step, a time difference information matching judgment means of the pager judges whether or not the time difference information acquired in the time difference information searching step is the same as time difference information which has been stored in a time difference information memory means of the pager. In the time difference information update step, the time difference information stored in the time difference information memory means is updated to the time difference information acquired in the time difference information searching step, if the time difference information matching judgment means judged in the time difference information matching judgment step that the time difference information acquired in the time difference information searching step is not the same as the time difference information which has been stored in the time difference information memory means. In the local time correction step, a local time correction means of the pager executes correction of the local time clocked by the local clock means based on the time difference information acquired in the time difference information searching step and the base time clocked by the base clock means, if the time difference information matching judgment means judged in the time difference information matching judgment step that the time difference information acquired in the time difference information searching step is not the same as the time difference information which has been stored in the time difference information memory means. And in the time display step, the base time clocked by the base clock means and the local time clocked by the local clock means are displayed by a time display means of the pager.

In accordance with an eleventh aspect of the present invention, in the tenth aspect, the time display method further comprises a local time correction information step. In the local time correction information step, an informing means of the pager informs the user about the correction of the local time and/or the corrected local time when the local time correction means executed the correction of the local time clocked by the local clock means in the local time correction step.

In accordance with a twelfth aspect of the present invention, in the tenth aspect, the time display method further comprises an area name display step. In the area name display step, an area name display means of the pager displays the names of a country and an area corresponding to the country code and the area code received in the code reception step, in the case where the code matching judgment means judged in the code matching judgment step that the country code and the area code received in the code reception step are not the same as the country code and the area code stored in the base area code memory means.

In accordance with a thirteenth aspect of the present invention, there is provided a time display method for a pager for receiving radio selective calling from a paging system. The time display method comprises a base area code memory step, a time difference table storage step, a base time clocking step, a local time clocking step, a code reception step, a code matching judgment step, a time difference information searching step, a time difference information matching judgment step, a time difference information update step, a local time correction inquiry step, a local time correction step, and a time display step. The steps other than the local time correction inquiry step and the local time correction step are executed basically in the same way as those in the time display method according to the tenth aspect of the present invention. In the local time correction inquiry step, a local time correction inquiry means of the pager inquires of the user about whether or not the user intends to let the pager correct the local time clocked by the local clock means, if the time difference information matching judgment means judged in the time difference information matching judgment step that the time difference information acquired in the time difference information searching step is not the same as the time difference information which has been stored in the time difference information memory means. In the local time correction step, a local time correction means of the pager executes correction of the local time clocked by the local clock means based on the time difference information acquired in the time difference information searching step and the base time clocked by the base clock means, if the user answered in the local time correction inquiry step that the user intends to let the pager correct the local time clocked by the local clock means. And in the time display step, the base time clocked by the base clock means and the local time clocked by the local clock means are displayed by a time display means of the pager.

In accordance with a fourteenth aspect of the present invention, in the thirteenth aspect, the time display method further comprises a local time correction information step. In the local time correction information step, an informing means of the pager informs the user about the correction of the local time and/or the corrected local time when the local time correction means executed the correction of the local time clocked by the local clock means in the local time correction step.

In accordance with a fifteenth aspect of the present invention, in the thirteenth aspect, the time display method further comprises an area name display step. In the area name display step, an area name display means of the pager displays the names of a country and an area corresponding to the country code and the area code received in the code reception step, in the case where the code matching judgment means judged in the code matching judgment step that the country code and the area code received in the code reception step are not the same as the country code and the area code stored in the base area code memory means.

In accordance with a sixteenth aspect of the present invention, there is provided a time display method for a pager for receiving radio selective calling from a paging system. The time display method comprises a base area code memory step, a time difference table storage step, a base time clocking step, a local time clocking step, a code reception step, a local time information reception step, a code matching judgment step, a time difference information searching step, a time difference information matching judgment step, a time difference information update step, a first local time correction step, a base time correction step, a second local time correction step, and a time display step. The steps other than the local time information reception step, the first local time correction step, the base time correction step and the second local time correction step are executed basically in the same way as those in the time display method according to the tenth aspect of the present invention. In the local time information reception step, a local time information reception means of the pager executes reception of local time information which is transmitted by the base station of the paging system. In the first local time correction step, a first local time correction means of the pager executes correction of the local time clocked by the local clock means based on the time difference information acquired in the time difference information searching step and the base time clocked by the base clock means, if the time difference information matching judgment means judged in the time difference information matching judgment step that the time difference information acquired in the time difference information searching step is not the same as the time difference information which has been stored in the time difference information memory means. In the base time correction step, a base time correction means of the pager executes correction of the base time clocked by the base clock means based on the local time information, if the code matching judgment means judged in the code matching judgment step that the country code and the area code received in the code reception step are the same as the country code and the area code stored in the base area code memory means and if the local time information reception means received the local time information in the local time information reception step. In the second local time correction step, a second local time correction means of the pager executes correction of the local time clocked by the local clock means based on the local time information, if the time difference information matching judgment means judged in the time difference information matching judgment step that the time difference information acquired in the time difference information searching step is not the same as the time difference information which has been stored in the time difference information memory means and if the local time information reception means received the local time information in the local time information reception step. And in the time display step, the base time clocked by the base clock means and the local time clocked by the local clock means are displayed by a time display means of the pager.

In accordance with a seventeenth aspect of the present invention, in the sixteenth aspect, the time display method further comprises a local time correction information step. In the local time correction information step, an informing means of the pager informs the user about the correction of the local time and/or the corrected local time when the first local time correction means executed the correction of the local time clocked by the local clock means in the local time correction step.

In accordance with an eighteenth aspect of the present invention, in the sixteenth aspect, the time display method further comprises an area name display step. In the area name display step, an area name display means of the pager displays the names of a country and an area corresponding to the country code and the area code received in the code reception step, in the case where the code matching judgment means judged in the code matching judgment step that the country code and the area code received in the code reception step are not the same as the country code and the area code stored in the base area code memory means.

BRIEF DESCRIPTION OF THE DRAWINGS

The objects and features of the present invention will become more apparent from the consideration of the following detailed description taken in conjunction with the accompanying drawings, in which:

FIG. 4 is a flow chart showing the operation of a pager according to a third embodiment of the present invention.

DESCRIPTION OF THE PREFERRED EMBODIMENTS

Figure 1:
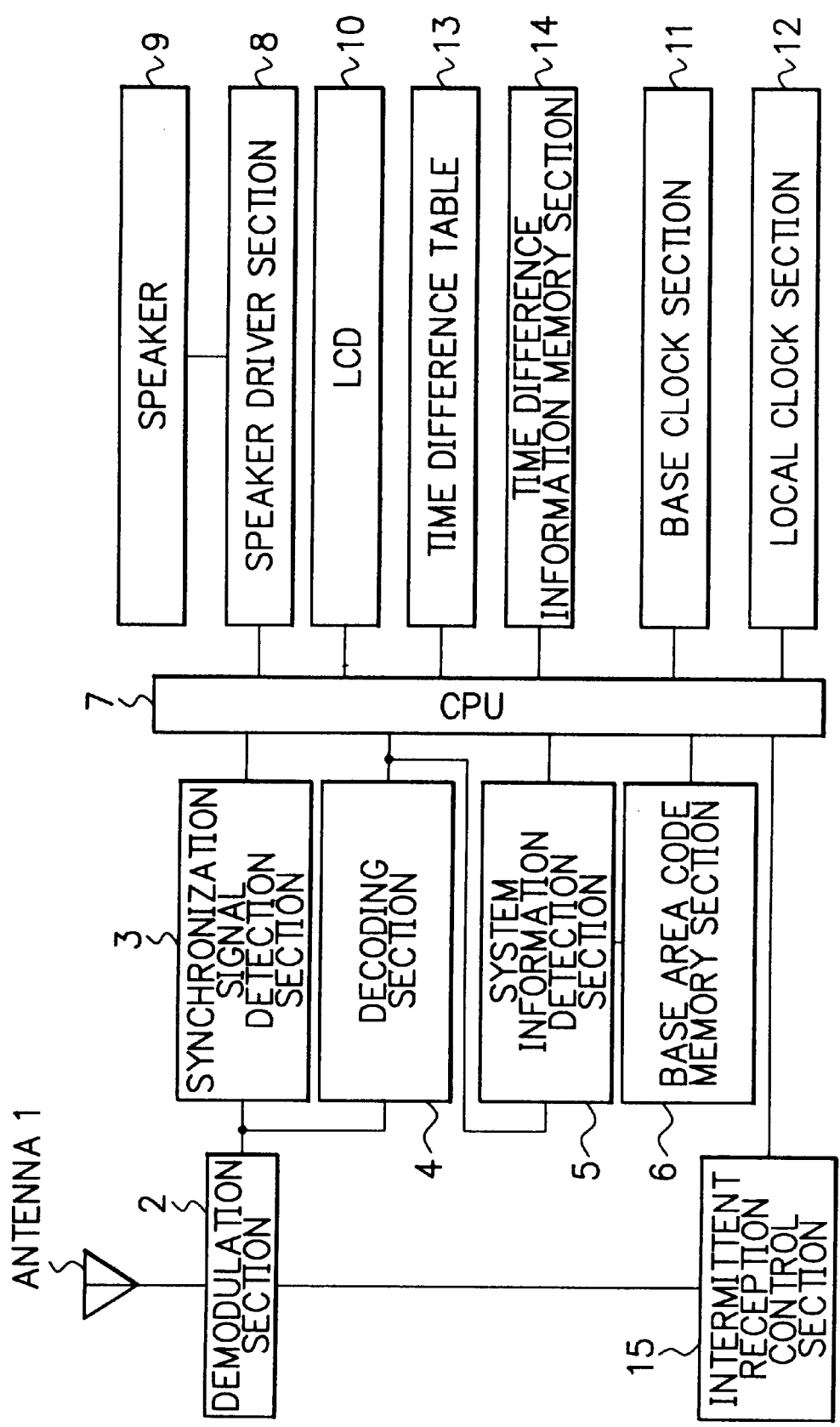
FIG. 1 is a block diagram showing a pager according to a first embodiment of the present invention.

Referring now to the drawings, a description will be given in detail of preferred embodiments in accordance with the present invention.

FIG. 1 is a block diagram showing a pager according to a first embodiment of the present invention. The pager comprises an antenna 1, a demodulation section 2, a synchronization signal detection section 3, a decoding section 4, a system information detection section 5, a base area code memory section 6, a CPU 7 (Central Processing Unit), a speaker driver section 8, a speaker 9, an LCD (Liquid Crystal Display) 10, a base clock section 11, a local clock section 12, a time difference table 13, a time difference information memory section 14, and an intermittent reception control section 15. The components of the pager of FIG. 1 (other than the antenna 1, the CPU 7, the speaker 9 and the LCD 10) are realized by, for example, one or more microprocessor units which are composed of one or more CPUs (Central Processing Units), ROM (Read Only Memory), RAM (Random Access Memory), etc. It is also possible to realize the components of the pager of FIG. 1 (other than the antenna 1, the speaker 9 and the LCD 10) by software and a microprocessor unit for executing the instructions of the software.

The demodulation section 2 is connected to the antenna 1. The synchronization signal detection circuit 3 and the decoding circuit 4 are connected to the demodulation section 2. The system information detection circuit 5 is connected to the decoding circuit 4 and the base area code memory section 6. The CPU 7 is connected with the synchronization signal detection circuit 3, the decoding circuit 4, the system information detection section 5, the base area code memory section 6, the speaker driver section 8, the LCD 10, the base clock section 11, the local clock section 12, the time difference table 13, the time difference information memory section 14 and the intermittent reception control section 15. The speaker driving section 8 is connected to the speaker 9 in order to drive the speaker 9. The intermittent reception control section 15 is connected to the demodulation section 2 for intermittently activating the demodulation section 2.

A base station of a paging system transmits a selective calling signal which contains system information, local time information and message information to pagers. The system information includes a country code and an area code. The local time information indicates local time of the area in which the base station is located. Incidentally, the pager of the first embodiment utilizes the country code and the area code included in the system information, and does not need the local time information in the operation which will be described later referring to FIG. 2. The demodulation section 2 of the pager receives the selective calling signal including the system information, local time information and message information via the antenna 1, demodulates the selective calling signal, and thereby outputs a demodulated signal. The synchronization signal detection section 3 receives the demodulated signal from the demodulation section 2 and detects a synchronization signal of each frame of the demodulated signal. The decoding section 4 decodes the demodulated signal outputted by the demodulation section 2 based on the synchronization signal detected by the synchronization signal detection section 3, and thereby outputs decoded data to the CPU 7 and the system information detection section 5.

The base area code memory section 6 stores a country code and an area code which indicate the base area of the pager of FIG. 1, that is, the country and the area in which the pager of FIG. 1 has been distributed. The country code and the area code indicating the base area is written in the base area code memory section 6 before the pager is distributed to the user. The system information detection section 5 detects and extracts a country code and an area code from the system information of the decoded data outputted by the decoding section 4, compares the country code and the area code with those stored in the base area code memory section 6, and informs the result of the comparison to the CPU 7. The speaker driving section 8 is a unit for driving the speaker 9 according to instructions of the CPU 7. The LCD 10 is used for displaying received messages (when a message is received), base time which is clocked by the base clock section 11, local time which is clocked by the local clock section 12, and the names of a country and an area which are designated by the country code and the area code included in the system information. The LCD 10 is also used for informing the user about update of time difference information, when the pager of FIG. 1 updated the time difference information. The intermittent reception control section 15 intermittently turns on power supply to the demodulation section 2, and thereby activates the demodulation section 2 at predetermined periods.

The time difference table 13 stores country codes and area codes of a plurality of countries and areas, and time differences of each country/area in comparison with the GMT (Greenwich Mean Time). The time difference information memory section 14 stores the time difference information concerning time difference between the base time and the local time. The time difference information is updated based on the result of search of the time difference table 13 using the country code and the area code which have been included in the system information. The time difference information memory section 14 includes a time difference update pointer. The time difference update pointer indicates whether or not the time difference information in the time difference information memory section 14 has been updated.

The base clock section 11 clocks the base time, that is, the time in the base area of the pager of FIG. 1. The local clock section 12 holds time which is calculated by the CPU 7 based on the time difference information which is stored in the time difference information memory section 14 and the base time which is clocked by the base clock section 11.

Figure 2:
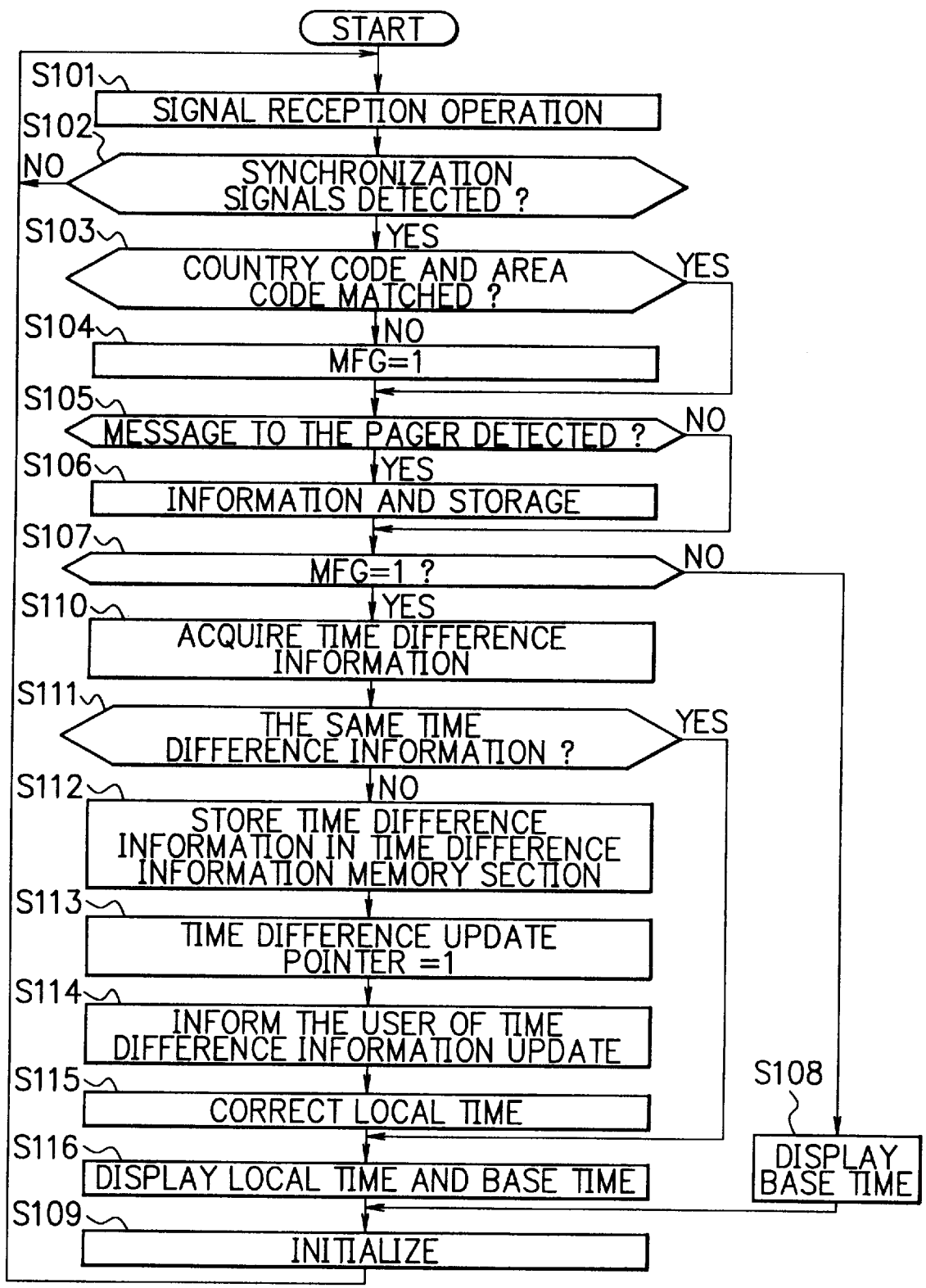
FIG. 2 is a flow chart showing the operation of a pager of the first embodiment of the present invention.

In the following, the operation of the pager according to the first embodiment of the present invention will be described referring to FIG. 1 and FIG. 2. FIG. 2 is a flow chart showing the operation of the pager of the first embodiment. The intermittent reception control section 15 intermittently turns on power supply to the demodulation section 2 and thereby activates the demodulation section 2 at predetermined periods. When the demodulation section 2 is under operating conditions, the demodulation section 2 receives the selective calling signal transmitted by the base station of the paging system via the antenna 1, and demodulates the selective calling signal. The selective calling signal contains the system information including the country code and the area code. The demodulation section 2 outputs the demodulated signal to the synchronization signal detection section 3 and the decoding section 4 (step S101).

In step S102, the synchronization signal detection section 3 judges whether or not synchronization signals in each frame of the demodulated signal can be detected. If the synchronization signals are detected in the frames of the demodulated signal ("YES" in the step S102), the process proceeds to step S103. If the synchronization signals are not detected ("NO" in the step S102), the process is returned to the step S101.

In the step S103, the decoding section 4 decodes the demodulated signal outputted by the demodulation section 2 based on the synchronization signal detected by the synchronization signal detection section 3 and thereby outputs decoded data. The system information detection section 5 detects and extracts the system information including the country code and the area code from the decoded data outputted by the decoding section 4, and judges whether or not the country code and the area code extracted from the decoded data are the same as those stored in the base area code memory section 6. If the country code and the area code are the same as those stored in the base area code memory section 6 ("YES" in the step S103), the process directly proceeds to step S105. If the country code and the area code are not the same as those stored in the base area code memory section 6 ("NO" in the step S103), a mismatch flag MFG is set at 1 (step S104), and the process proceeds to the step S105.

In the step S105, the CPU 7 judges whether or not a message to the pager itself has been received. If the message to the pager has not been received ("NO" in the step S105), the process directly proceeds to step S107. If the message to the pager has been received ("YES" in the step S105), the process proceeds to the next step S106. In the step S106, the CPU7 informs the user of reception of the message by making a beep from the speaker 9 by activating the speaker driver section 8, displays the message on the LCD 10, and stores the message in a reception message memory.

In the step S107, the CPU 7 checks whether or not the mismatch flag MFG has been set at 1. If the mismatch flag MFG has not been set at 1 ("NO" in the step S107), the CPU 7 displays the base time (which is clocked by the base clock section 11) only on the LCD 10 (step S108), and the process proceeds to step S109. Incidentally, if both the base time and the local time have been displayed on the LCD 10 at the point of the step S108, the CPU 7 stops the display of the local time. If the mismatch flag MFG has been set at 1 ("YES" in the step S107), the CPU 7 acquires time difference information from the time difference table 13 by searching the time difference table 13 using the country code and the area code outputted by the system information detection section 5 (step S110). In the next step S111, the CPU 7 judges whether or not the time difference information acquired in the step S110 is the same as the time difference information which has been stored in the time difference information memory section 14. If the time difference information is the same ("YES" in the step S111), the process proceeds to step S116.

If the time difference information is not the same ("NO" in the step S111), process from step 112 to step S115 is executed. In the step S112, the CPU 7 stores the time difference information acquired in the step S110 in the time difference information memory section 14 (i.e. updates the time difference information). In the step S113, the CPU 7 sets the time difference update pointer at 1. In the step S114, the CPU 7 confirms that the time difference update pointer in the time difference information memory section 14 has been set at 1, and informs the user that the time difference information has just been updated, by making a beep from the speaker 9. At the same time, the CPU 7 displays the names of the country and the area which are designated by the received country code and the received area code on the LCD 10. In the step S115, the CPU 7 corrects the local time which is clocked by the local clock section 12. The local time correction of the step S115 is executed in the case where the received country code and the received area code (which have been detected by the system information detection section 5) are not the same as the base country code and the base area code which are stored in the base area code memory section 6 (the mismatch flag MFG=1) and the time difference update pointer in the time difference information memory section 14 has been set at 1. In the local time correction of the step S115, the CPU 7 calculates local time by referring to the base time of the base clock section 11 and the time difference information stored in the time difference information memory section 14, and gives the calculated local time to the local clock section 12.

In the step S116, the CPU 7 displays the local time and the base time on the LCD 10. At the same time, the CPU 7 displays the names of the country and the area which are designated by the country code and the area which have been detected by the system information detection section 5, on the LCD 10.

In the next step S109, the CPU 7 executes initialization. In the initialization, the mismatch flag MFG and the time difference update pointer in the time difference information memory section 14 are initialized (reset to 0).

As described above, in the pager according to the first embodiment of the present invention, when the pager is located in an area outside the base area of the pager, the time difference information of the area outside the base area (where time difference from the base time occurs) is acquired immediately and correctly based on the country code and the area code which are contained in the system information of the selective calling signal transmitted by a base station of the paging system, and the local time of the area outside the base area is displayed on the LCD 10 based on the acquired time difference information, along with displaying the base time of the base area of the pager on the LCD 10.

In the case where the time difference information acquired based on the country code and the area code in the system information is different from time difference information which has been stored in the time difference information memory section 14 (i.e. in the case where the pager moved to an area of different time difference), the time difference information in the time difference information memory section 14 is updated and the user is informed about the update of the time difference information by the beep from the speaker 9 and the display on the LCD 10, and the local time clocked by the local clock section 12 is corrected based on the updated time difference information and the base time clocked by the base clock section 11. On the LCD 10, the names of the country and the area in which the pager is located can also be displayed.

Figure 3:
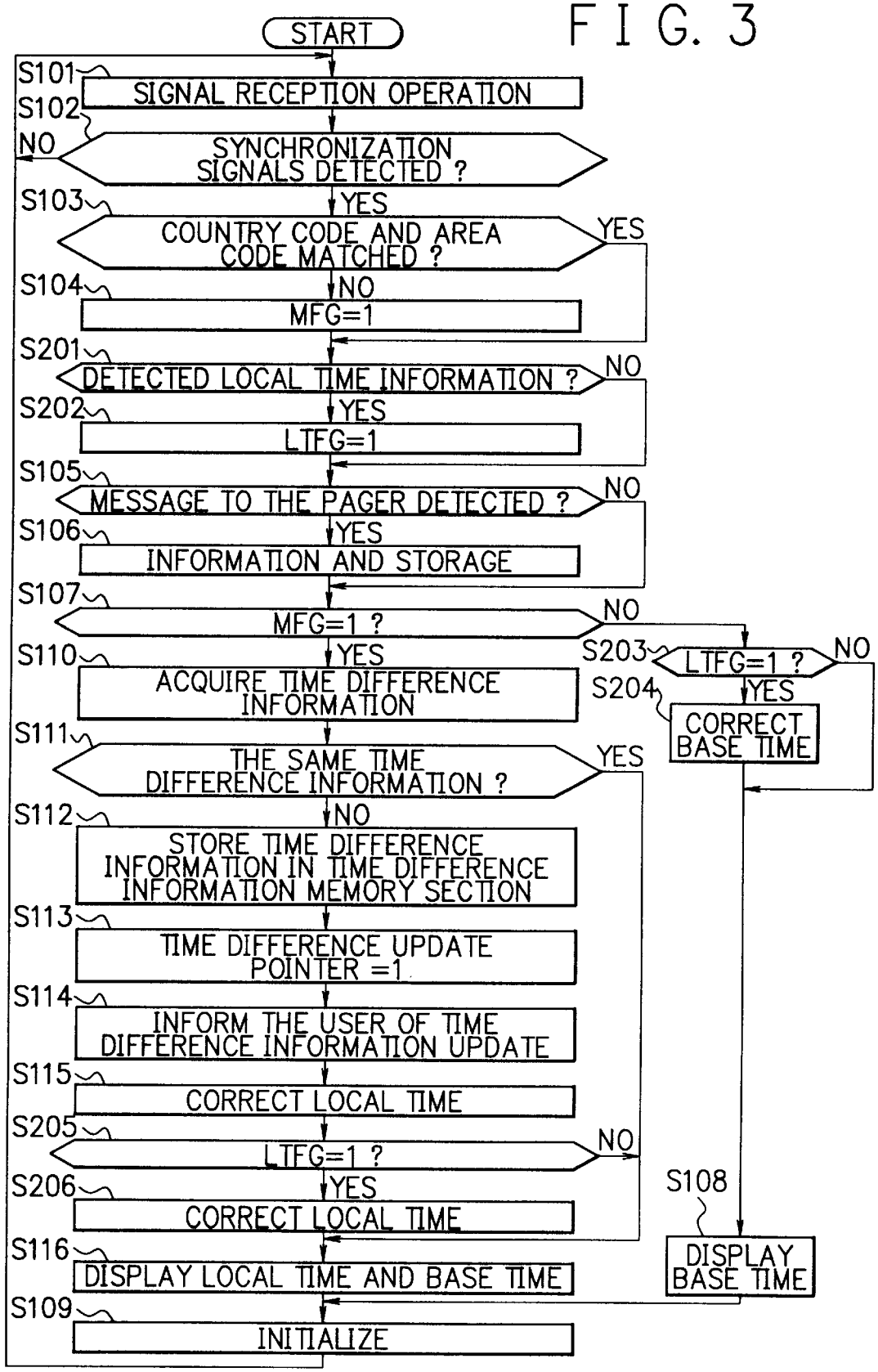
FIG. 3 is a flow chart showing the operation of a pager according to a second embodiment of the present invention.

In the following a pager according to a second embodiment of the present invention will be described referring to FIG. 1 and FIG. 3. FIG. 3 is a flow chart showing the operation of the pager of the second embodiment. The pager of the second embodiment has basically the same composition as the pager of the first embodiment as shown in FIG. 1, however, the operation is a little different. Incidentally, in FIG. 3, the same step number as that used in FIG. 2 is used when the operation in the step is the same as that in FIG. 2.

The pager of second embodiment is realized and is effective in the case where the local time information is contained in the selective calling signal transmitted by the base stations of the paging system. The difference of the second embodiment from the first embodiment is that the pager of the second embodiment further employs a local time information acquisition flag LTFG, and the flow chart of FIG. 3 further includes steps for reflecting acquired (received) local time information in either the base time clocked by the base clock section 11 or the local time clocked by the local clock section 12. Concretely, the flow chart of FIG. 3 further includes steps S201 and S202 between the steps S104 and S105 of FIG. 2, and steps S203 and S204 between the steps S107 and S108 of FIG. 2, and steps S205 and S206 between the steps S115 and S116 of FIG. 2.

The operation of the pager in the steps S101 through S104 is the same as that in the first embodiment, and thus explanation thereof is omitted for brevity. In the step S201, the CPU 7 judges whether or not the local time information has been detected in the decoded data outputted by the decoding section 4. If the local time information has not been detected ("NO" in the step S201), the process directly proceeds to the step S105. If the local time information has been detected ("YES" in the step S201), the CPU 7 sets the local time information acquisition flag LTFG at 1 (step S202), and thereafter proceeds to the step S105.

The operation of the pager in the steps S105 through S107 is the same as that in the first embodiment, and thus explanation thereof is omitted. If the mismatch flag MFG has not been set at 1 ("NO" in the step S107), the process proceeds to the step S203 and the CPU 7 judges whether or not the local time information acquisition flag LTFG has been set at 1. If the local time information acquisition flag LTFG has not been set at 1 ("NO" in the step S203), the CPU 7 displays the base time on the LCD 10 (step S108) and proceeds to the step S109. If the local time information acquisition flag LTFG has been set at 1 ("YES" in the step S203), the CPU 7 corrects the base time clocked by the base clock section 11 based on the local time information (which indicates the "base time" since the pager is located in the base area) decoded by the decoding section 4 (step S204), thereafter displays the base time on the LCD 10 (step S108), and proceeds to the step S109.

If the mismatch flag MFG has been set at 1 ("YES" in the step S107), the process proceeds to the step S110. The operation of the pager in the steps S110 through S115 is the same as that in the first embodiment, and thus explanation thereof is omitted. In the step S205 after the step S115, the CPU 7 judges whether or not the local time information acquisition flag LTFG has been set at 1. If the local time information acquisition flag LTFG has not been set at 1 ("NO" in the step S205), the process directly proceeds to the step S116 and the CPU 7 displays the local time and the base time (and the names of the country and the area) on the LCD 10. If the local time information acquisition flag LTFG has been set at 1 ("YES" in the step S205), the CPU 7 corrects the local time clocked by the local clock section 12 based on the local time information (which indicates the "local time" since the pager is located outside the base area) decoded by the decoding section 4 (step S206), thereafter displays the local time and the base time (and the names of the country and the area) on the LCD 10 (step S116), and proceeds to the step S109. In the step S109, the CPU 7 executes initialization. In the initialization, the mismatch flag MFG, the time difference update pointer in the time difference information memory section 14, and the local time information acquisition flag LTFG are initialized (reset to 0).

As described above, by the pager according to the second embodiment of the present invention, in addition to the effects of the first embodiment, the base time which has been adjusted based on the local time information can be displayed on the LCD 10 in the case where the pager received the local time information transmitted by a base station of the paging system in the base area, and the local time which has been adjusted based on the local time information can be displayed on the LCD 10 in the case where the pager received the local time information transmitted by a base station of the paging system outside the base area.

In the following a pager according to a third embodiment of the present invention will be described referring to FIG. 1 and FIG. 4. FIG. 4 is a flow chart showing the operation of the pager of the third embodiment. The pager of the third embodiment has basically the same composition as the pager of the first embodiment as shown in FIG. 1, however, the operation is a little different. Incidentally, in FIG. 4, the same step number as that used in FIG. 2 is used when the operation in the step is the same as that in FIG. 2.

The pager of third embodiment inquires of the user about whether or not the user intends to let the pager correct (update) the local time clocked by the local clock section 12 and display the corrected local time on the LCD 10. Therefore, the flow chart of FIG. 4 further includes steps S301 and S302 between the steps S114 and S115 of FIG. 2.

The operation of the pager in the steps S101 through S114 is the same as that in the first embodiment, and thus explanation thereof is omitted for brevity. In the step S301 after the step S114, the CPU 7 displays "UPDATE LOCAL TIME? (YES or NO)" on the LCD 10 in order to ask the user whether or not the user intends to update and display the local time. In the next step S302, the CPU 7 executes switch status judgment. In the switch status judgment, the CPU 7 waits for key input by the user and judges whether the user pushed a key corresponding to "YES" or a key corresponding to "NO". If the user answered "NO" in the step S302, the CPU 7 displays the base time only on the LCD 10 (step S108) and proceeds to the step S109. If the user answered "YES" in the step S302, the CPU 7 corrects the local time clocked by the local clock section 12 based on the base time of the base clock section 11 and the time difference information stored in the time difference information memory section 14 (step S115), thereafter displays the local time and the base time (and the names of the country and the area) on the LCD 10 (step S116), and proceeds to the step S109. In the step S109, the CPU 7 executes initialization. In the initialization, the mismatch flag MFG and the time difference update pointer in the time difference information memory section 14 are initialized (reset to 0).

As described above, by the pager according to the third embodiment of the present invention, in addition to the effects of the first embodiment, the user of the pager located outside the base area can make a choice between "correcting the local time based on the time difference information and displaying the local time and the base time on the LCD 10" and "displaying the base time only on the LCD 10 without correcting the local time".

As set forth hereinabove, in the pager and the time display method for a pager according to the present invention, when the pager is carried to an area outside the base area of the pager, time difference information of the area outside the base area (where time difference from the base time occurs) is acquired immediately and correctly based on the country code and the area code which are contained in the system information of the selective calling signal transmitted by a base station of the paging system, and thereby the time of day clocked by the local clock section 12 is automatically corrected to the local time in the area in which the pager is located, and the corrected local time is displayed to the user, along with displaying the base time clocked by the base clock section 11 which indicates the time of day in the base area of the pager. Therefore, when the pager is located outside the base area of the pager, the user can see the base time in the base area of the pager, along with seeing the corrected local time in the area outside the base area.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A pager for receiving radio selective calling from a paging system, comprising:

a base area code memory means for prestoring a country code and an area code which indicate the base area of the pager;

a time difference table storage means for prestoring a table including country codes and area codes of a plurality of countries and areas and time difference information of each country/area in comparison with a reference time such as the GMT (Greenwich Mean Time);

a base clock means for clocking base time, which is the time in the base area of the pager;

a local clock means for clocking local time, which is the time in an area in which the pager is located;

a code reception means for receiving a country code and an area code which are transmitted by a base station of the paging system;

a code matching judgment means for judging whether or not the country code and the area code received by the code reception means are the same as the country code and the area code stored in the base area code memory means;

a time difference information searching means for searching the time difference table storage means for a piece of time difference information based on the country code and the area code received by the code reception means, if the code matching judgment means judged that the country code and the area code received by the code reception means are not the same as the country code and the area code stored in the base area code memory means;

a time difference information matching judgment means for judging whether or not the time difference information acquired by the time difference information searching means is the same as time difference information which has been stored in a time difference information memory means;

the time difference information memory means in which time difference information stored therein is updated to the time difference information acquired by the time difference information searching means by the search, if the time difference information matching judgment means judged that the time difference information acquired by the time difference information searching means is not the same as the time difference information which has been stored in the time difference information memory means;

a local time correction means for executing correction of the local time clocked by the local clock means based on the time difference information acquired by the time difference information searching means and the base time clocked by the base clock means, if the time difference information matching judgment means judged that the time difference information acquired by the time difference information searching means is not the same as the time difference information which has been stored in the time difference information memory means; and a time display means for displaying the base time clocked by the base clock means and the local time clocked by the local clock means.

2. A pager as claimed in claim 1, further comprising an informing means for informing the user about the correction of the local time and/or the corrected local time when the local time correction means executed the correction of the local time clocked by the local clock means.

3. A pager as claimed in claim 1, further comprising an area name display means for displaying the names of a country and an area corresponding to the country code and the area code received by the code reception means, in the case where the code matching judgment means judged that the country code and the area code received by the code reception means are not the same as the country code and the area code stored in the base area code memory means.

4. A pager for receiving radio selective calling from a paging system, comprising:

a base area code memory means for prestoring a country code and an area code which indicate the base area of the pager;

a time difference table storage means for prestoring a table including country codes and area codes of a plurality of countries and areas and time difference information of each country/area in comparison with a reference time such as the GMT (Greenwich Mean Time);

a base clock means for clocking base time, which is the time in the base area of the pager;

a local clock means for clocking local time, which is the time in an area in which the pager is located;

a code reception means for receiving a country code and an area code which are transmitted by a base station of the paging system;

a code matching judgment means for judging whether or not the country code and the area code received by the code reception means are the same as the country code and the area code stored in the base area code memory means;

a time difference information searching means for searching the time difference table storage means for a piece of time difference information based on the country code and the area code received by the code reception means, if the code matching judgment means judged that the country code and the area code received by the code reception means are not the same as the country code and the area code stored in the base area code memory means;

a time difference information matching judgment means for judging whether or not the time difference information acquired by the time difference information searching means is the same as time difference information which has been stored in a time difference information memory means;

the time difference information memory means in which time difference information stored therein is updated to the time difference information acquired by the time difference information searching means by the search, if the time difference information matching judgment means judged that the time difference information acquired by the time difference information searching means is not the same as the time difference information which has been stored in the time difference information memory means;

a local time correction inquiry means for inquiring of the user about whether or not the user intends to let the pager correct the local time clocked by the local clock means, if the time difference information matching judgment means judged that the time difference information acquired by the time difference information searching means is not the same as the time difference information which has been stored in the time difference information memory means;

a local time correction means for executing correction of the local time clocked by the local clock means based on the time difference information acquired by the time difference information searching means and the base time clocked by the base clock means, if the user answered to the local time correction inquiry means that the user intends to let the pager correct the local time clocked by the local clock means; and a time display means for displaying the base time clocked by the base clock means and the local time clocked by the local clock means.

5. A pager as claimed in claim 4, further comprising an informing means for informing the user about the correction of the local time and/or the corrected local time when the local time correction means executed the correction of the local time clocked by the local clock means.

6. A pager as claimed in claim 4, further comprising an area name display means for displaying the names of a country and an area corresponding to the country code and the area code received by the code reception means, in the case where the code matching judgment means judged that the country code and the area code received by the code reception means are not the same as the country code and the area code stored in the base area code memory means.

7. A pager for receiving radio selective calling from a paging system, comprising:

a base area code memory means for prestoring a country code and an area code which indicate the base area of the pager;

a time difference table storage means for prestoring a table including country codes and area codes of a plurality of countries and areas and time difference information of each country/area in comparison with a reference time such as the GMT (Greenwich Mean Time);

a base clock means for clocking base time, which is the time in the base area of the pager;

a local clock means for clocking local time, which is the time in an area in which the pager is located;

a code reception means for receiving a country code and an area code which are transmitted by a base station of the paging system;

a local time information reception means for receiving local time information which is transmitted by the base station of the paging system;

a code matching judgment means for judging whether or not the country code and the area code received by the code reception means are the same as the country code and the area code stored in the base area code memory means;

a time difference information searching means for searching the time difference table storage means for a piece of time difference information based on the country code and the area code received by the code reception means, if the code matching judgment means judged that the country code and the area code received by the code reception means are not the same as the country code and the area code stored in the base area code memory means;

a time difference information matching judgment means for judging whether or not the time difference information acquired by the time difference information searching means is the same as time difference information which has been stored in a time difference information memory means;

the time difference information memory means in which time difference information stored therein is updated to the time difference information acquired by the time difference information searching means by the search, if the time difference information matching judgment means judged that the time difference information acquired by the time difference information searching means is not the same as the time difference information which has been stored in the time difference information memory means;

a first local time correction means for executing correction of the local time clocked by the local clock means based on the time difference information acquired by the time difference information searching means and the base time clocked by the base clock means, if the time difference information matching judgment means judged that the time difference information acquired by the time difference information searching means is not the same as the time difference information which has been stored in the time difference information memory means;

a base time correction means for executing correction of the base time clocked by the base clock means based on the local time information, if the code matching judgment means judged that the country code and the area code received by the code reception means are the same as the country code and the area code stored in the base area code memory means and if the local time information reception means received the local time information transmitted by the base station of the paging system;

a second local time correction means for executing correction of the local time clocked by the local clock means based on the local time information, if the time difference information matching judgment means judged that the time difference information acquired by the time difference information searching means is not the same as the time difference information which has been stored in the time difference information memory means and if the local time information reception means received the local time information transmitted by the base station of the paging system; and a time display means for displaying the base time clocked by the base clock means and the local time clocked by the local clock means.

8. A pager as claimed in claim 7, further comprising an informing means for informing the user about the correction of the local time and/or the corrected local time when the first local time correction means executed the correction of the local time clocked by the local clock means.

9. A pager as claimed in claim 7, further comprising an area name display means for displaying the names of a country and an area corresponding to the country code and the area code received by the code reception means, in the case where the code matching judgment means judged that the country code and the area code received by the code reception means are not the same as the country code and the area code stored in the base area code memory means.

10. A time display method for a pager for receiving radio selective calling from a paging system, comprising the steps of:

a base area code memory step in which a country code and an area code which indicate the base area of the pager are prestored in a base area code memory means of the pager;

a time difference table storage step in which a table including country codes and area codes of a plurality of countries and areas and time difference information of each country/area in comparison with a reference time such as the GMT (Greenwich Mean Time) is prestored in a time difference table storage means of the pager;

a base time clocking step in which a base clock means of the pager clocks base time, which is the time in the base area of the pager;

a local time clocking step in which a local clock means of the pager clocks local time, which is the time in an area in which the pager is located;

a code reception step in which a code reception means of the pager receives a country code and an area code which are transmitted by a base station of the paging system;

a code matching judgment step in which a code matching judgment means of the pager judges whether or not the country code and the area code received in the code reception step are the same as the country code and the area code stored in the base area code memory means;

a time difference information searching step in which a time difference information searching means of the pager searches the time difference table storage means for a piece of time difference information based on the country code and the area code received in the code reception step, if the code matching judgment means judged in the code matching judgment step that the country code and the area code received in the code reception step are not the same as the country code and the area code stored in the base area code memory means;

a time difference information matching judgment step in which a time difference information matching judgment means of the pager judges whether or not the time difference information acquired in the time difference information searching step is the same as time difference information which has been stored in a time difference information memory means of the pager;

a time difference information update step in which the time difference information stored in the time difference information memory means is updated to the time difference information acquired in the time difference information searching step, if the time difference information matching judgment means judged in the time difference information matching judgment step that the time difference information acquired in the time difference information searching step is not the same as the time difference information which has been stored in the time difference information memory means;

a local time correction step in which a local time correction means of the pager executes correction of the local time clocked by the local clock means based on the time difference information acquired in the time difference information searching step and the base time clocked by the base clock means, if the time difference information matching judgment means judged in the time difference information matching judgment step that the time difference information acquired in the time difference information searching step is not the same as the time difference information which has been stored in the time difference information memory means; and a time display step in which the base time clocked by the base clock means and the local time clocked by the local clock means are displayed by a time display means of the pager.

11. A time display method for a pager as claimed in claim 10, further comprising a local time correction information step in which an informing means of the pager informs the user about the correction of the local time and/or the corrected local time when the local time correction means executed the correction of the local time clocked by the local clock means in the local time correction step.

12. A time display method for a pager as claimed in claim 10, further comprising an area name display step in which an area name display means of the pager displays the names of a country and an area corresponding to the country code and the area code received in the code reception step, in the case where the code matching judgment means judged in the code matching judgment step that the country code and the area code received in the code reception step are not the same as the country code and the area code stored in the base area code memory means.

13. A time display method for a pager for receiving radio selective calling from a paging system, comprising the steps of:

a base area code memory step in which a country code and an area code which indicate the base area of the pager are prestored in a base area code memory means of the pager;

a time difference table storage step in which a table including country codes and area codes of a plurality of countries and areas and time difference information of each country/area in comparison with a reference time such as the GMT (Greenwich Mean Time) is prestored in a time difference table storage means of the pager;

a base time clocking step in which a base clock means of the pager clocks base time, which is the time in the base area of the pager;

a local time clocking step in which a local clock means of the pager clocks local time, which is the time in an area in which the pager is located;

a code reception step in which a code reception means of the pager receives a country code and an area code which are transmitted by a base station of the paging system;

a code matching judgment step in which a code matching judgment means of the pager judges whether or not the country code and the area code received in the code reception step are the same as the country code and the area code stored in the base area code memory means;

a time difference information searching step in which a time difference information searching means of the pager searches the time difference table storage means for a piece of time difference information based on the country code and the area code received in the code reception step, if the code matching judgment means judged in the code matching judgment step that the country code and the area code received in the code reception step are not the same as the country code and the area code stored in the base area code memory means;

a time difference information matching judgment step in which a time difference information matching judgment means of the pager judges whether or not the time difference information acquired in the time difference information searching step is the same as time difference information which has been stored in a time difference information memory means of the pager;

a time difference information update step in which the time difference information stored in the time difference information memory means is updated to the time difference information acquired in the time difference information searching step, if the time difference information matching judgment means judged in the time difference information matching judgment step that the time difference information acquired in the time difference information searching step is not the same as the time difference information which has been stored in the time difference information memory means;

a local time correction inquiry step in which a local time correction inquiry means of the pager inquires of the user about whether or not the user intends to let the pager correct the local time clocked by the local clock means, if the time difference information matching judgment means judged in the time difference information matching judgment step that the time difference information acquired in the time difference information searching step is not the same as the time difference information which has been stored in the time difference information memory means;

a local time correction step in which a local time correction means of the pager executes correction of the local time clocked by the local clock means based on the time difference information acquired in the time difference information searching step and the base time clocked by the base clock means, if the user answered in the local time correction inquiry step that the user intends to let the pager correct the local time clocked by the local clock means; and a time display step in which the base time clocked by the base clock means and the local time clocked by the local clock means are displayed by a time display means of the pager.

14. A time display method for a pager as claimed in claim 13, further comprising a local time correction information step in which an informing means of the pager informs the user about the correction of the local time and/or the corrected local time when the local time correction means executed the correction of the local time clocked by the local clock means in the local time correction step.

15. A time display method for a pager as claimed in claim 13, further comprising an area name display step in which an area name display means of the pager displays the names of a country and an area corresponding to the country code and the area code received in the code reception step, in the case where the code matching judgment means judged in the code matching judgment step that the country code and the area code received in the code reception step are not the same as the country code and the area code stored in the base area code memory means.

16. A time display method for a pager for receiving radio selective calling from a paging system, comprising the steps of:

a base area code memory step in which a country code and an area code which indicate the base area of the pager are prestored in a base area code memory means of the pager;

a time difference table storage step in which a table including country codes and area codes of a plurality of countries and areas and time difference information of each country/area in comparison with a reference time such as the GMT (Greenwich Mean Time) is prestored in a time difference table storage means of the pager;

a base time clocking step in which a base clock means of the pager clocks base time, which is the time in the base area of the pager;

a local time clocking step in which a local clock means of the pager clocks local time, which is the time in an area in which the pager is located;

a code reception step in which a code reception means of the pager receives a country code and an area code which are transmitted by a base station of the paging system;

a local time information reception step in which a local time information reception means of the pager executes reception of local time information which is transmitted by the base station of the paging system;

a code matching judgment step in which a code matching judgment means of the pager judges whether or not the country code and the area code received in the code reception step are the same as the country code and the area code stored in the base area code memory means;

a time difference information searching step in which a time difference information searching means of the pager searches the time difference table storage means for a piece of time difference information based on the country code and the area code received in the code reception step, if the code matching judgment means judged in the code matching judgment step that the country code and the area code received in the code reception step are not the same as the country code and the area code stored in the base area code memory means;

a time difference information matching judgment step in which a time difference information matching judgment means of the pager judges whether or not the time difference information acquired in the time difference information searching step is the same as time difference information which has been stored in a time difference information memory means of the pager;

a time difference information update step in which the time difference information stored in the time difference information memory means is updated to the time difference information acquired in the time difference information searching step, if the time difference information matching judgment means judged in the time difference information matching judgment step that the time difference information acquired in the time difference information searching step is not the same as the time difference information which has been stored in the time difference information memory means;

a first local time correction step in which a first local time correction means of the pager executes correction of the local time clocked by the local clock means based on the time difference information acquired in the time difference information searching step and the base time clocked by the base clock means, if the time difference information matching judgment means judged in the time difference information matching judgment step that the time difference information acquired in the time difference information searching step is not the same as the time difference information which has been stored in the time difference information memory means;

a base time correction step in which a base time correction means of the pager executes correction of the base time clocked by the base clock means based on the local time information, if the code matching judgment means judged in the code matching judgment step that the country code and the area code received in the code reception step are the same as the country code and the area code stored in the base area code memory means and if the local time information reception means received the local time information in the local time information reception step;

a second local time correction step in which a second local time correction means of the pager executes correction of the local time clocked by the local clock means based on the local time information, if the time difference information matching judgment means judged in the time difference information matching judgment step that the time difference information acquired in the time difference information searching step is not the same as the time difference information which has been stored in the time difference information memory means and if the local time information reception means received the local time information in the local time information reception step; and a time display step in which the base time clocked by the base clock means and the local time clocked by the local clock means are displayed by a time display means of the pager.

17. A time display method for a pager as claimed in claim 16, further comprising a local time correction information step in which an informing means of the pager informs the user about the correction of the local time and/or the corrected local time when the first local time correction means executed the correction of the local time clocked by the local clock means in the local time correction step.

18. A time display method for a pager as claimed in claim 16, further comprising an area name display step in which an area name display means of the pager displays the names of a country and an area corresponding to the country code and the area code received in the code reception step, in the case where the code matching judgment means judged in the code matching judgment step that the country code and the area code received in the code reception step are not the same as the country code and the area code stored in the base area code memory means.

* * * * *